(Model.)
J. VIDIE.
BOTTLE FOR AERATED AND GASEOUS BEVERAGES.
No. 307,244.          Patented Oct. 28, 1884.
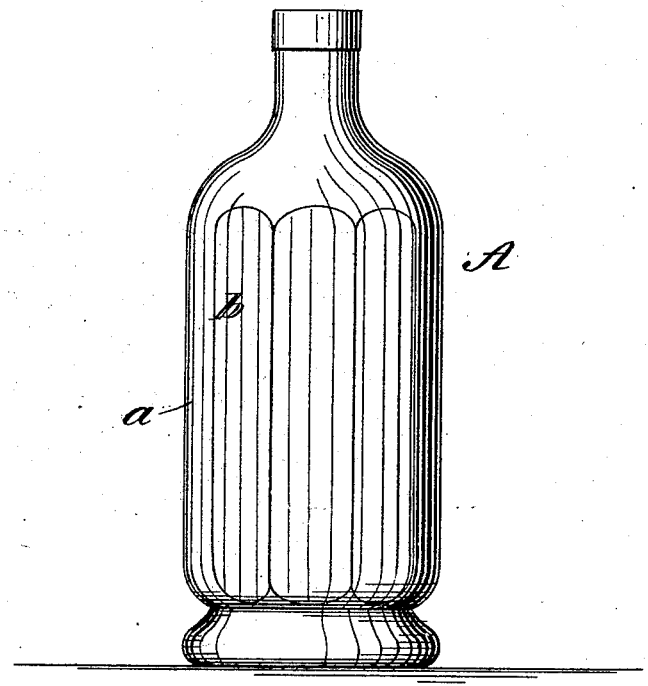
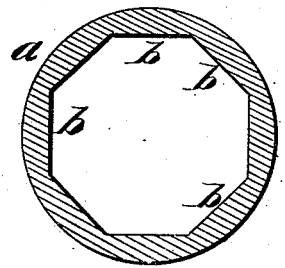
WITNESSES:
Dom Twitchell.
C. Sedgwick.
INVENTOR:
J. Vidie
BY Munn & Co.
ATTORNEYS.

UNITED STATES PATENT OFFICE.

JAMES VIDIE, OF PANTIN, FRANCE.

BOTTLE FOR AERATED AND GASEOUS BEVERAGES.

SPECIFICATION forming part of Letters Patent No. 307,244, dated October 28, 1884.

Application filed August 14, 1884. (Model.) Patented in France October 19, 1883, No. 149,928, and in England February 25, 1884, No. 3,977.

*To all whom it may concern:*

Be it known that I, JAMES VIDIE, of Pantin, France, have invented a new and useful Improvement in Processes of Manufacturing Bottles, of which the following is a full, clear, and exact description.

My improvement consists in the process of manufacture, as described and claimed hereinafter.

Reference is to be had to the accompanying drawings, forming a part of this specification, in which similar letters of reference indicate corresponding parts in both the figures.

Figure 1 is a side view, and Fig. 2 a cross-section, of the bottle.

The body of the bottle A is of rounded or cylindrical form on its external surface, *a*. Internally the surface is of octagonal, hexagonal, or polygonal form in cross-section, so as to present faces or panels *b*. In this form the bottle is very strong compared to its weight, and is thereby especially adapted for holding liquids under pressure, and the internal formation imparts great brilliancy to the material. A further effect is to magnify the bubbles when the liquid is drawn off. The bottle can be made in any colored glass.

The process of manufacture is as follows: The operator, taking a ball of metal from the melting-pot, with a blow-pipe blows it to an oval or pear shape. The ball of glass is then placed in an iron mold of the octagonal or other form, and blown therein until the glass adheres to the sides of the mold and takes its shape. The ball is then placed in another mold of round or cylindrical form and blown, and while being blown it is rolled in the mold until it takes the round form. The bottle is then finished in the usual way.

Having thus described my invention, I claim as new and desire to secure by Letters Patent—

The hereinbefore-described process of making bottles, which consists in first blowing the ball of metal in a polygonal mold and then rolling the ball while distended by blowing in a second mold of cylindrical form, substantially as described.

JAMES VIDIE.

Witnesses:
JOHN McGHEE,
ROBT. M. HOOPER.